United States Patent
Abd Elhamid et al.

(10) Patent No.: US 9,281,703 B2
(45) Date of Patent: *Mar. 8, 2016

(54) COST-EFFECTIVE RELIABLE METHOD TO DEPOWER RECHARGEABLE ELECTRIC BATTERIES

(71) Applicant: GM Global Technology Operations LLC, Detroit, MI (US)

(72) Inventors: Mahmoud H. Abd Elhamid, Troy, MI (US); Tao Xie, Troy, MI (US); Tao Wang, Oakland Township, MI (US); Ramona Y. Ying, Rochester Hills, MI (US); Robert S. Conell, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

This patent is subject to a terminal disclaimer.

(21) Appl. No.: 13/705,753

(22) Filed: Dec. 5, 2012

(65) Prior Publication Data

US 2013/0147435 A1   Jun. 13, 2013

Related U.S. Application Data

(60) Provisional application No. 61/568,391, filed on Dec. 8, 2011.

(51) Int. Cl.
*H02J 7/00* (2006.01)
*H01M 10/44* (2006.01)

(52) U.S. Cl.
CPC ............. *H02J 7/0063* (2013.01); *H01M 10/44* (2013.01); *H01M 2220/20* (2013.01)

(58) Field of Classification Search
USPC .......................................................... 320/135
See application file for complete search history.

(56) References Cited

U.S. PATENT DOCUMENTS

| | | | | |
|---|---|---|---|---|
| 4,407,909 A | * | 10/1983 | Goebel | 429/50 |
| 2010/0320970 A1 | * | 12/2010 | Paczkowski | 320/127 |

* cited by examiner

*Primary Examiner* — Samuel Berhanu
(74) *Attorney, Agent, or Firm* — Dinsmore & Shohl LLP (57) ABSTRACT

Methods and systems for depowering a rechargeable battery in a rapid, yet controlled, manner. The methods comprise (i) providing a depowering medium comprising expanded graphite (and optionally, one or more dispersible non-ionic electric conductors) dispersed in a substantially non-ionic aqueous medium; (ii) contacting terminals of the battery with the depowering medium; and (iii) maintaining contact between the depowering medium and terminals for a period of time sufficient to depower the battery. The systems comprise (i) the depowering medium; and (ii) a container configured to receive a battery and the depowering medium such that the battery body is contacted with the depowering medium prior to the terminals.

15 Claims, 5 Drawing Sheets

GM Global Technology Operations LLC

Legal Staff, GM Comp., Detroit, MI

COST-EFFECTIVE RELIABLE METHOD TO DEPOWER RECHARGEABLE ELECTRIC BATTERIES

This application claims the benefit of Provisional Application Ser. No. 61/568,391, filed Dec. 8, 2011.

FIELD

The present disclosure relates to rapid depowering of rechargeable batteries in a controlled manner using expanded graphite dispersed in a substantially non-ionic aqueous medium.

BACKGROUND

Various batteries, including lithium-ion, lead acid and nickel-metal hydride variants, may be configured to have rechargeable attributes. Such batteries may be used as a rechargeable energy storage system (RESS) as a way to supplement or supplant conventional internal combustion engines (ICEs) for automotive applications. The ability to passively store energy from stationary and portable sources, as well as from recaptured kinetic energy provided by the vehicle and its components, makes batteries (in general) and rechargeable batteries (in particular) ideal to serve as part of a propulsion system for cars, trucks, buses, motorcycles and related vehicular platforms. Several such batteries may typically be combined in a module, section, or pack to generate the desired power and energy output.

Because an energized battery cell, module, section or pack is capable of producing large amounts of energy, there may be circumstances where depowering is desired. For example, where an energized battery is to be stored, transported, or handled, it may be desirable to depower the battery. Conventional methods of depowering an intact rechargeable battery involve using an electrical circuit or a load bank. Under circumstances where such conventional methods are not applicable, feasible or limited, an ionically-conductive aqueous solution, dispersion or suspension can be used to depower the battery. In one form, such solution may include sodium chloride, sodium sulfate, or other salts. While useful for providing an electrolytic medium and the related depowering of electric batteries, such solutions can lead to corrosion of sensitive battery components (such as tabs, leads or the like) and the evolution of gaseous byproducts (specifically, hydrogen, oxygen and chlorine) during battery depower. Corrosion of the positive end of a battery complicates the depowering process and can allow for the aqueous solution to enter the battery and cause severe damage to the battery electrodes. Moreover, such solutions can lead to temperature spikes during the depowering process, thereby subjecting battery separators, electrodes, electrolytes and other components to damaging temperatures.

The present inventors have discovered new ways to depower automotive batteries. One way that a battery can be sufficiently depowered is by applying to the battery carbon black or carbon fiber suspended in a substantially non-ionic aqueous medium. Such methods are dependent upon the conductivity, viscosity, component solubilities, and component concentrations of the depowering medium used therein. Given such factors, there is a possibility that an undesirable rate or duration of depowering may occur when such methods are employed. Also, such methods may not be suitable for rapid depowering due to the upper conductivity limits of the carbon medium used. Additionally, because such methods tend to require a high level of carbon loading in order to achieve the desired level of conductivity, the viscosity of the depowering medium may rise to a level that makes its use impractical. Moreover, the use of dispersing agents (for example, sodium carboxymethyl cellulose) to keep the carbon black or carbon fiber suspended in the aqueous medium may exacerbate the viscosity problem, as well as increase manufacturing costs.

SUMMARY

In various embodiments, provided are methods and systems for depowering a rechargeable battery in a rapid yet controlled manner while, among other things, inhibiting evolution of gases and rapid heat release. The battery may be selected from lithium-ion, lead acid, and nickel-metal hydride batteries. Accordingly, the provided methods and systems are suitable for use with automotive batteries, including those used as part of a rechargeable energy storage system (RESS).

In some of the various embodiments, the provided methods comprise (i) providing a battery to be depowered; (ii) providing a substantially non-ionic depowering medium comprising expanded graphite; (iii) contacting positive and negative terminals of the battery with the depowering medium; and (iv) maintaining contact between the depowering medium and the terminals for a period of time sufficient to depower the battery. The depowering medium can be prepared by (i) providing a substantially non-ionic aqueous medium; (ii) providing the expanded graphite (and optionally, one or more dispersible non-ionic electric conductors); and (iii) dispersing the expanded graphite (along with any optional electric conductors used) in the aqueous medium in a manner sufficient to form a uniform mixture (for example, a slurry, suspension, or related mixture). Expanded graphite is a form of graphite that is exfoliated to increase its specific volume, and because it is readily soluble/dispersible in water, conductivity of water can be increased without use of dispersing agents or thickeners. Moreover, the aforementioned viscosity issues encountered with use of carbon black- or carbon fiber-based solutions can be reduced or avoided. Additionally, because expanded graphite is non-ionic, gassing reactions of $H_2$ and $O_2$ (as seen when ionic conductors are used for depowering) may be reduced or avoided, as can tab corrosion issues.

Also provided in some of the various embodiments are systems for rapid, yet controlled, battery depowering. In some of such embodiments, a provided system is configured to supply depowering medium to the interior of a battery, module, section, or pack. Such a system comprises (a) a container that contains (or is configured to receive) (i) a substantially non-ionic aqueous medium; (ii) expanded graphite (and optionally, one or more non-ionic electric conductors); or (iii) both; (b) one or more lines (for example, pipes, tubes, or hoses) configured to fluidly connect the container and the battery, module, section, or pack; and (c) a pressurizing device fluidly connected to the container, one or more lines, and battery, module, section, or pack. In some embodiments, the depowering medium is supplied to the container. In other embodiments, one or more components are supplied to the container and the depowering medium is formed therein by mixing. In such embodiments, the provided system may optionally have (a) a supply line for the aqueous medium; (b) an expanded graphite supply cartridge or container; (c) a supply cartridge or container for non-ionic electric conductor(s); or (d) combinations thereof, located upstream of the container. In operation of such systems, depowering medium is supplied to the interior of the battery, module, section, or pack to be depowered and circulated therethrough for a period of time sufficient for rapid depowering.

In other embodiments, the provided system is configured to supply depowering medium to the exterior of a battery, module, section, or pack. Such a system comprises (i) a substantially non-ionic depowering medium comprising expanded graphite (and optionally, one or more dispersible electric conductors); and (ii) a container configured to (a) receive a battery to be depowered; and to (b) receive the depowering medium such that a battery body is contacted with the depowering medium prior to positive and negative battery terminals (or voltage tabs) being contacted with the depowering medium. In operation, a battery to be depowered is received in the container of the system, and the depowering medium is supplied to the container such that the terminals/tabs of the battery, module, section, or pack are contacted with the depowering medium for a period of time sufficient for rapid depowering.

BRIEF DESCRIPTION OF THE DRAWINGS

A more complete appreciation of the many embodiments of the present disclosure will be readily obtained as the same becomes better understood by reference to the following detailed description when considered in connection with the accompanying drawings, wherein.

DETAILED DESCRIPTION

Specific embodiments of the present disclosure will now be described. The invention may, however, be embodied in different forms and should not be construed as limited to the embodiments set forth herein. Rather, these embodiments are provided so that this disclosure will be thorough and complete and will fully convey the scope of the same to those skilled in the art.

Unless otherwise defined, all technical and scientific terms used herein have the same meaning as commonly understood by one of ordinary skill in the art to which this disclosure belongs. The terminology used in the present disclosure is for describing particular embodiments only and is not intended to be limiting. As used in the specification and appended claims, the singular forms "a," "an," and "the" are intended to include the plural forms as well, unless the context clearly indicates otherwise.

Recitations of "at least one" component, element, etc. in the present disclosure and appended claims should not be used to create an inference that the alternative use of the articles "a" or "an" should be limited to a single component, element, etc.

In the present disclosure and appended claims, recitations of a component being "configured" to embody a particular property, or function in a particular manner, are structural recitations, as opposed to recitations of intended use. More specifically, references to the manner in which a component is "configured" denotes an existing physical condition of the component and, as such, is to be taken as a definite recitation of the structural characteristics of the component.

As used in the present disclosure and appended claims, terms like "preferably," "commonly," and "typically" are not utilized to limit the scope of the claims or to imply that certain features are critical, essential, or even important to the structure or function of the claimed embodiments. Rather, these terms are merely intended to identify particular aspects of an embodiment of the present disclosure or to emphasize alternative or additional features that may or may not be utilized in a particular embodiment of the present disclosure.

The terms "substantially" and "approximately," as used in the present disclosure and appended claims, represent the inherent degree of uncertainty that may be attributed to any quantitative comparison, value, measurement, or other representation. Such terms are also utilized to represent the degree by which a quantitative representation may vary from a stated reference without resulting in a change in the basic function of the subject matter at issue.

As used in the present disclosure and appended claims, the term "automotive" is intended to refer to cars, trucks, buses, motorcycles, and related vehicular platforms.

The term "battery," as used in the present disclosure and appended claims, is intended to encompass an individual electrochemical cell configured to delivery electric current to a load, as well as a battery module, section, or pack comprising a plurality of such electrochemical cells. Thus, unless the context clearly indicates otherwise, the terms are used interchangeably herein.

Unless otherwise indicated, all numbers expressing quantities, properties, conditions, and so forth as used in the specification and claims are to be understood as being modified in all instances by the term "about." Additionally, the disclosure of any ranges in the specification and claims are to be understood as including the range itself and also anything subsumed therein, as well as endpoints. Notwithstanding that numerical ranges and parameters setting forth the broad scope of the disclosure are approximations, the numerical values set forth in the specific examples are reported as precisely as possible. Any numerical values, however, inherently contain certain errors necessarily resulting from error found in their respective measurements.

Methods

In various embodiments, provided are methods of rapid depowering of a rechargeable battery. Among other things, such methods are configured to depower a battery while inhibiting evolution of gases and rapid heat release, and they are suitable for use in controlled depowering regardless of the condition or format of the battery. Generally, the provided methods comprise (i) providing a battery to be depowered; (ii) providing a substantially non-ionic depowering medium comprising expanded graphite; (iii) contacting positive and negative terminals of the battery with the depowering medium; and (iv) maintaining contact between the depowering medium and the positive and negative terminals for a period of time sufficient to depower the battery.

While the present disclosure is not limited to specific applications, in some embodiments, the battery to be depowered is an automotive battery. Thus, the battery may be selected from lithium-ion, lead acid, and nickel-metal hydride batteries. Accordingly, the provided methods may be used with batteries that are part of a rechargeable energy storage system (RESS) of a vehicle. An automotive battery is typically configured to have a positive terminal, a negative terminal, and a body that comprises one or more electrochemical cells. In the provided methods, depowering of the battery (whether alone or as part of a module, section, or pack) comprises applying a depowering medium across the positive and negative battery terminals (or voltage tabs). In some embodiments, such contact does not occur until after the battery body has been contacted with the depowering medium.

In addition to providing a battery to be depowered, the provided methods comprise providing a depowering medium comprising expanded graphite. In some embodiments, the depowering medium is provided in an application-ready form (i.e. pre-mixed or partially pre-mixed with appropriate quantities of components). In other embodiments, the depowering medium must be prepared. Accordingly, the provided methods may further comprise forming the depowering medium by (i) providing a substantially non-ionic aqueous medium; (ii) providing the expanded graphite; and (iii) dispersing the expanded graphite in the aqueous medium in a manner sufficient to form a uniform mixture (for example, a slurry, suspension, or related mixture). The depowering medium can be prepared at the site of depowering or beforehand. For example, the expanded graphite (along with any non-ionic electric conductors that may be desired) can be provided pre-mixed and dispersed in water available at the site of depowering. As another example, the depowering medium can be completely prepared in advance of depowering and transported to the depowering site. As yet another example, the individual components can be transported to the depowering site and combined there to form the depowering medium.

The substantially non-ionic aqueous medium comprises water that has a low salt content. Accordingly, the water may be selected from tap water, distilled water, de-ionized water, filtered water, or water from a fresh water source (for example, spring, lake, pond, or river). Water is a particularly useful aqueous medium because of its ability to manage the heat generated during battery depowering, as well as being environmentally-neutral in the event of a spill. Moreover, aqueous solutions made from such ingredients are low-cost. It is important, however, to avoid use of ionic water sources (for example, sea water). The substantially non-ionic aqueous medium may, in some embodiments, also comprise ethylene glycol, which also aids in absorption of heat generated during depowering. The amount of ethylene glycol present can, in some embodiments, be from about 10 to about 50 weight percent (wt %). Thus, the aqueous medium may comprise 10-15 wt %, 15-20 wt %, 20-25 wt %, 25-30 wt %, 30-35 wt %, 35-40 wt %, 40-45 wt %, 45-50 wt % ethylene glycol.

The depowering medium comprises expanded graphite in an amount sufficient to provide enough conductivity to depower the battery but not enough to make the fluid too viscous to be impractical for use. This attribute contributes to an ease of application that is not present in methods that utilize carbon black or carbon fiber instead of expanded graphite. Because carbon black and carbon fiber are (relative to expanded graphite) hydrophobic, depowering media comprising such components tend to require use of dispersing agents. However, the present methods do not require, and preferably avoid, use of dispersing agents. In some embodiments, the amount of expanded graphite present in the depowering medium may be from about 1 to about 20 wt %. Accordingly, the depowering medium may comprise 1-5 wt %, 5-10 wt %, 10-15 wt %, and 15-20 wt % expanded graphite. In one example, the depowering medium may have 15 wt % expanded graphite. In another example, the depowering medium may have 17 wt % expanded graphite. In yet another example, the depowering medium may have 20 wt % expanded graphite.

While the provided depowering medium does not require use of dispersing agents or thickeners, the depowering medium may, in some embodiments, comprise one or more dispersible non-ionic electric conductors selected from metallic powders, low melting point metallic alloys that are liquids at room temperatures, and conductive ceramics. Such materials may be used to reduce the electrical resistance of the depowering medium while maintaining an aqueous environment so as to help maintain good thermal management during the depowering process. One example of a suitable alloy is Ga—In—Sn, which has reasonably good electrical and thermal conductivities relative to other electrically conductive fluids. Examples of suitable metallic powders include copper, zinc, iron, nickel, and combinations thereof. Examples of suitable conductive ceramics include titanium oxynitride, titanium diboride, titanium nitride, titanium carbide, chromium nitride, chromium carbide, and combinations thereof. Whether the depowering medium comprises only expanded graphite or expanded graphite and one or more dispersible electric conductors, such components are dispersed in the aqueous medium in a manner sufficient to form a uniform mixture (for example, a slurry, suspension, or related mixture). Mixing can be achieved through use of an industrial mixing apparatus, a non-industrial mixing apparatus, or by hand mixing.

In some embodiments, the depowering medium used in the methods has a viscosity of from about 100 cP to about 50,000 cP. Accordingly, the viscosity may be 100-1000 cP; 1000-5000 cP; 5000-10,000 cP; 10,000-15,000 cP; 15,000-20,000 cP; 20,000-25,000 cP; 25,000-30,000 cP; 30,000-35,000 cP; 35,000-40,000 cP; 40,000-45,000 cP; 45,000-50,000 cP. The depowering medium may, in some embodiments, have a resistivity of from about 0.5 $\Omega \cdot cm$ to about 100 $\Omega \cdot cm$. Accordingly, the resistivity may be 0.5-5 $\Omega \cdot cm$, 5-10 $\Omega \cdot cm$, 10-15 $\Omega \cdot cm$, 15-20 $\Omega \cdot cm$, 20-25 $\Omega \cdot cm$, 25-30 $\Omega \cdot cm$, 30-35 $\Omega \cdot cm$, 35-40 $\Omega \cdot cm$, 40-45 $\Omega \cdot cm$, 45-50 $\Omega \cdot cm$, 50-55 $\Omega \cdot cm$, 55-60 $\Omega \cdot cm$, 60-65 $\Omega \cdot cm$, 65-70 $\Omega \cdot cm$, 70-75 $\Omega cm$, 75-80 $\Omega \cdot cm$, 85-90 $\Omega \cdot cm$, 90-95 $\Omega \cdot cm$, 95-100 $\Omega \cdot cm$.

Figure 2:
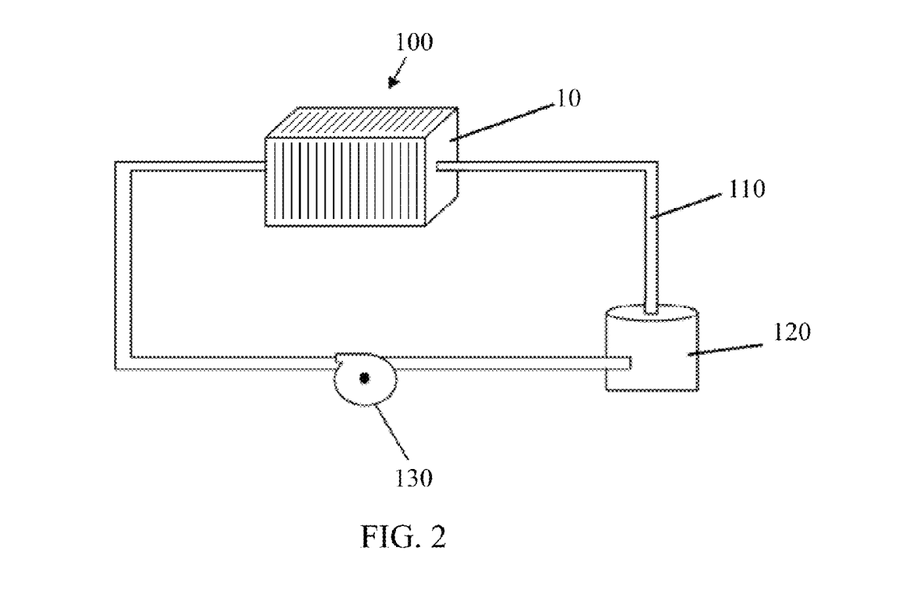
FIG. 2 shows, in simplified form, one way a battery may be depowered using certain provided systems and methods, namely by supplying depowering medium to the interior of a battery.
Figure 3:
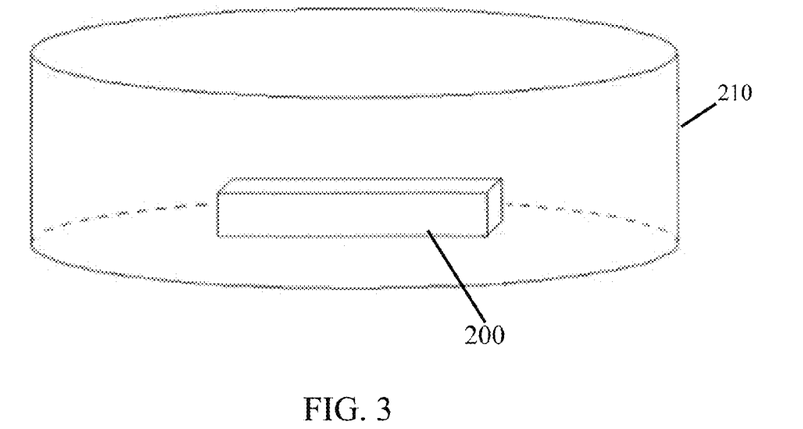
FIG. 3 illustrates, in simplified form, another way a battery may be depowered using certain provided systems and methods, namely by supplying depowering medium to the exterior of a battery.
Figure 4:
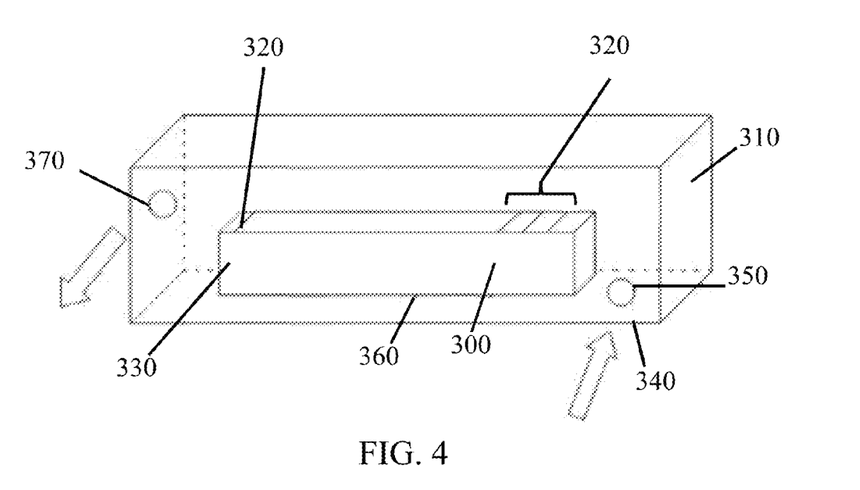
FIG. 4 illustrates, in simplified form, yet another way a battery may be depowered using certain provided system and methods, namely by supplying depowering medium to the exterior of a battery.

In addition to providing a battery and a depowering medium, the provided methods comprise contacting positive and negative terminals (or voltage tabs) of the battery with the depowering medium. Such contact can be achieved in a variety of ways without departing from the scope of the present disclosure. One example (which is illustrated in FIG. 2) is pumping depowering medium into a battery, module, section, or pack. In such an example, the substantially non-ionic aqueous medium, expanded graphite, or both, may be housed in or supplied to a chamber wherein they are mixed and pumped to a battery, module, section, or pack configured to be connectable to such a system. Another example (which is illustrated in FIG. 3 and FIG. 4) is disposing a battery into a container configured to contain a fluid and providing sufficient depowering medium into the container to immerse the battery. In such an example, the container can be, but does not have to be, one specifically configured for use with the provided methods. An example of a container configured for use with the provided methods is one comprising a bottom portion and one or more fluid inlets disposed in, or proximate to, the bottom portion, such container being configured to (i) receive the battery; and (ii) receive the depowering medium through the one or more fluid inlets such that the battery body is contacted with the depowering medium prior to the positive and negative battery terminals being contacted with the depowering medium.

In addition to providing a battery, providing a depowering medium, and contacting positive and negative terminals (or voltage tabs) of the battery with the depowering medium, the provided methods comprise maintaining contact between the depowering medium and the positive and negative terminals (or voltage tabs) for a period of time sufficient to depower the battery. In some embodiments, a sufficient period of time may be from about 1 to about 10 hours. Accordingly, in such embodiments contact between the depowering medium and the battery terminals/tabs may be 1-2 hours, 2-4 hours, 4-6 hours, 6-8 hours, and 8-10 hours. In some embodiments, a sufficient period of time may be from about 1 to about 72 hours. Accordingly, in such embodiments contact between the depowering medium and the battery terminals/tabs may be 1-9 hours, 9-18 hours, 18-27 hours, 27-36 hours, 36-45 hours, 45-54 hours, 54-63 hours, 63-72 hours. Good results have been achieved with a period of time of 1-24 hours.

In some embodiments, depowering is controlled such that the battery (or components thereof) is maintained at temperatures sufficient to prevent critical damage. For example, it may be desirable to maintain the average temperature below 90° C., 80° C., 70° C., or 60° C. so as to avoid damaging, among other components, a polymeric separator existing between the anode and cathode. Additionally, the provided methods allow for controlled depowering while inhibiting evolution of $H_2$, $O_2$, and $Cl_2$ or other gases.

Systems

In various embodiments, also provided in the present disclosure are systems for battery depowering. Some embodiments of such systems are configured for supplying depowering medium to the interior of a battery, module, section, or pack, whereas other embodiments of such systems are configured for supplying depowering medium to the exterior of a battery, module, section, or pack. Regardless of the type of configuration, the depowering medium used in the provided systems is that disclosed with respect to the provided methods. Thus, the depowering medium comprises expanded graphite (and optionally, one or more dispersible non-ionic electric conductors) dispersed in a substantially non-ionic aqueous medium.

In those embodiments wherein the system is configured to supply depowering medium to the interior of the battery, the system generally comprises (a) a container that contains (or is configured to receive) (i) a substantially non-ionic aqueous medium; (ii) expanded graphite (and optionally, one or more non-ionic electric conductors); or (iii) both; (b) one or more lines (for example, pipes, tubes, or hoses) configured to fluidly connect the container and the battery to be depowered; and (c) a pressurizing device (for example, a pump) fluidly connected to the container, one or more lines, and battery. Thus, the system comprises depowering medium. However, the depowering medium may be supplied to the container, or one or more components of the depowering medium may be supplied to the container and the depowering medium formed in situ. In the latter embodiments, the provided system may optionally comprise (a) a supply line for the aqueous medium; (b) an expanded graphite supply cartridge or container; (c) a supply cartridge or container for one or more non-ionic electric conductors; or (d) combinations thereof, located upstream of the container. In operation of the provided system, depowering medium is supplied to the interior of the battery and circulated therethrough for a period of time sufficient to depower in a controlled manner.

In those embodiments wherein the system is configured to supply depowering medium to the exterior of the battery, the system generally comprises (i) depowering medium; and (ii) a container configured to (a) receive a battery to be depowered, such battery having a positive terminal, a negative terminal, and a body comprising one or more electrochemical cells; and to (b) receive the depowering medium such that the battery body is contacted with the depowering medium prior to the positive and negative battery terminals being contacted with the depowering medium. In operation of the provided system, the battery is received in the container, and the depowering medium is supplied to the container such that the positive and negative terminals of the battery are contacted with the depowering medium for a period of time sufficient to depower the battery.

The container used in the system may, in some embodiments, comprise a bottom portion and one or more fluid inlets disposed in, or proximate to, the bottom portion. In such embodiments, the container is configured to receive the depowering medium through the one or more fluid inlets such that the battery body (for example, the bottom of the battery) is contacted with the depowering medium prior to the positive and negative battery terminals being contacted with the depowering medium.

EXAMPLES

The described embodiments will be better understood by reference to the following examples which are offered by way of illustration and which one of skill in the art will recognize are not meant to be limiting.

Example 1

Figure 1:
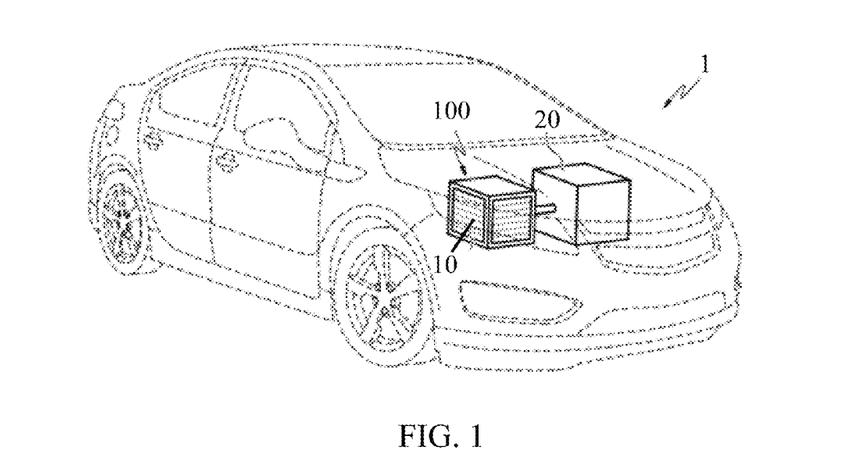
FIG. 1 illustrates a vehicle with a hybrid propulsion system in the form of a battery module and an internal combustion engine.

Referring to FIG. 1, a vehicle 1 includes a hybrid propulsion system in the form of a conventional ICE 20 and a battery module 100 made up of numerous battery cells 10. Such a vehicle is known as a hybrid electric vehicle (HEV). It will be appreciated by those skilled in the art that vehicle 1 may not require an ICE 20; in such case, rather than being an HEV, it is an electric vehicle (EV); either form is within the scope of the present disclosure. The individual battery cells 10 are typically arranged in a repeating array as shown. In one typical example, battery module 100 may have two hundred individual battery cells 10, although it will be appreciated by those skilled in the art that additional or fewer cells 10 may be needed, depending on the power and energy required. Additional drivetrain components (none of which are shown) useful in providing propulsive power to one or more of the wheels and coupled to one or both of the battery module 100 and ICE 20 are understood to include electric motors, rotating shafts, axles, transmission or the like.

FIG. 2 illustrates one example of a method and system for depowering a battery module 100. In such method, a substantially non-ionic aqueous medium is supplied to a container 120 that contains (or that is configured to receive) expanded graphite, thereby forming a depowering medium. The aqueous medium may be supplied to the container 120 through a conventional fluid line (not shown). After appropriate mixing in the container 120, the resulting depowering medium is supplied to the battery module 100 through a fluid line 110 and circulated to the cells 10 thereof. In a variation on the embodiment depicted in FIG. 2, a cartridge or container (not shown) for holding the expanded graphite (and optionally, one or more other electric conductors) may be placed upstream of container 120. In either configuration, a pressurizing device (such as a pump) 130 may be used to facilitate the delivery of the aqueous medium to the container 120 and the depowering medium to the battery module 100. Ancillary equipment (such as valves, controllers or the like, none of which are shown) are also understood to be present as part of the system.

Example 2

Referring to FIG. 3, illustrated is one example of a method and system for depowering a battery pack 200. In such method, the battery pack 200 is disposed in a container 210 configured to receive and contain a fluid. Enough depowering medium (for example, expanded graphite suspended in water) is supplied to the container 210 to contact positive and negative terminals (not shown). In one variation on the embodiment depicted in FIG. 3, the depowering medium can be supplied to the container 210 and the battery pack 200 can be lowered into the depowering medium. In another variation on the embodiment depicted in FIG. 3, the depowering medium can be prepared in the container 210 by supplying the aqueous medium, expanded graphite, and optional components (for example, non-ionic dispersible electric conductor) and mixing them in the container 210 to form the depowering medium. Ancillary equipment (not shown) is also understood to be present as part of the depicted system.

Example 3

Referring to FIG. 4, illustrated is one example of a method and system for depowering a battery 300. In such method, the battery 300 is disposed in a container 310 configured to (a) receive a battery 300 having positive and negative terminals (voltage taps) 320 and a body 330 comprising a plurality of electrochemical cells; and to (b) receive a depowering medium in a manner wherein the battery body 330 is contacted with the depowering medium prior to the voltage taps 320 being contacted with the depowering medium. In order to achieve such contact, the container 310 comprises a bottom portion 340 and a fluid inlet 350 disposed in, or proximate to, the bottom portion 340. The container receives depowering medium through the fluid inlet 350 such that the bottom 360 of the battery 300 is contacted with the depowering medium prior to the voltage taps 320 being contacted with the depowering medium. Optionally, the container 310 can have a fluid outlet 370 wherein depowering medium supplied to the container 310 can be removed. The fluid inlet 350 and fluid outlet 370 may be connected as part of a closed loop system. A pressurizing device (not shown) may be used to facilitate flow of the depowering medium to the container 310. Ancillary equipment (such as valves, controllers or the like, none of which are shown) are also understood to be present as part of the depicted system.

Example 4

Figure 5:
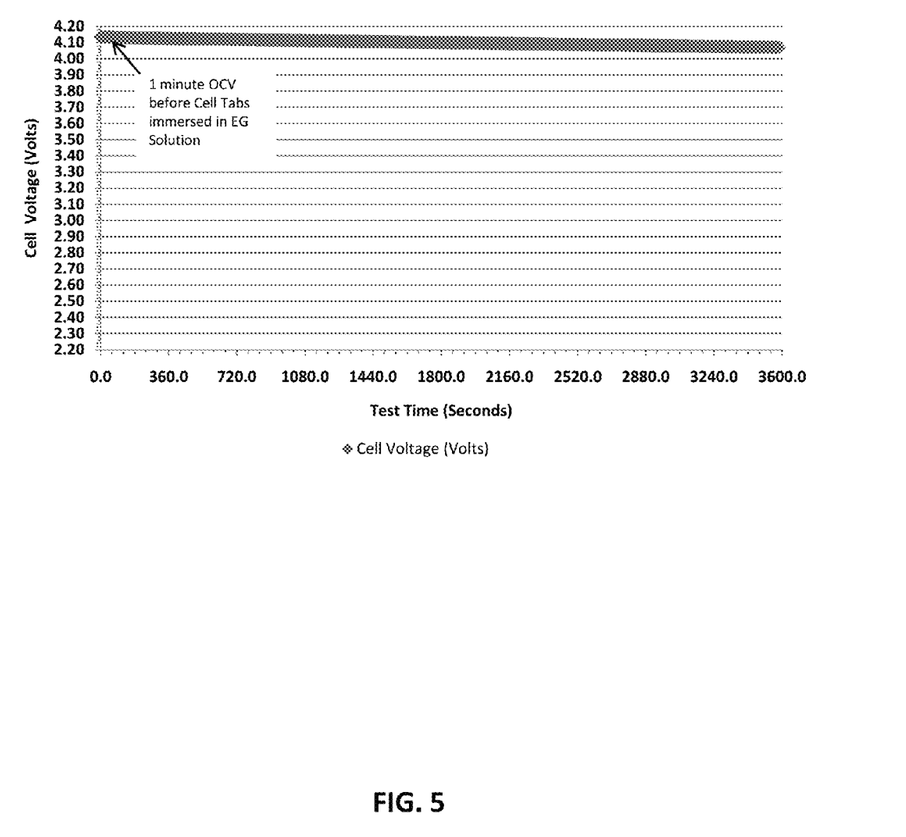
FIG. 5 illustrates, according to an aspect of the present disclosure, controlled depowering of a lithium ion battery over a one hour period of time using 17 weight percent (wt %) expanded graphite in water.
Figure 6:
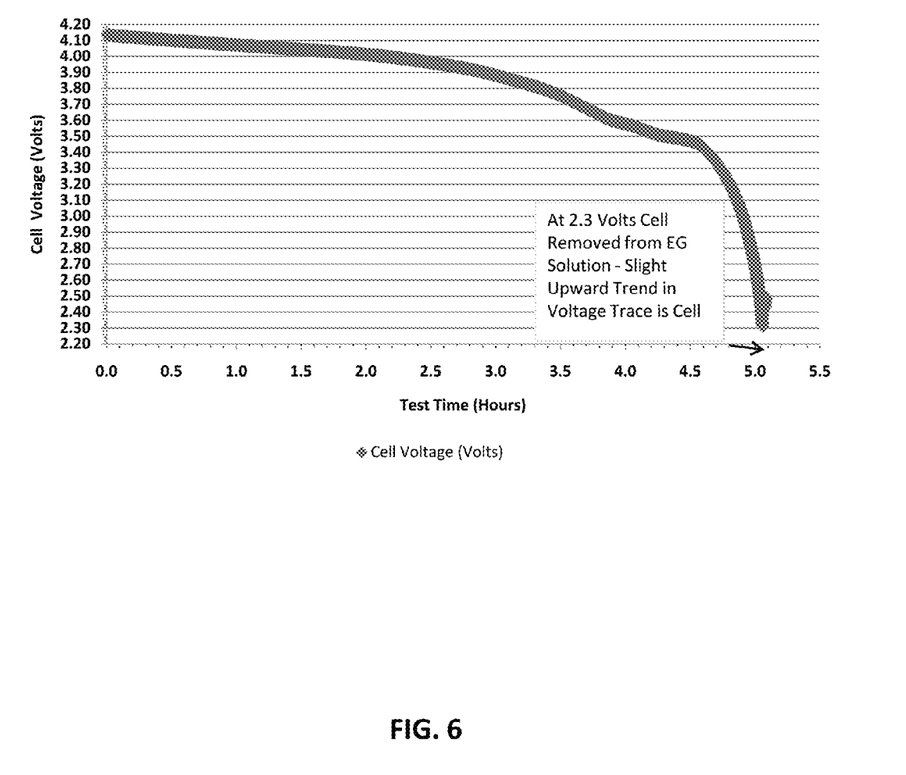
FIG. 6 illustrates a detailed view of the depowering of a battery of FIG. 5, wherein substantially complete discharge is achieved in five hours.
Figure 7:
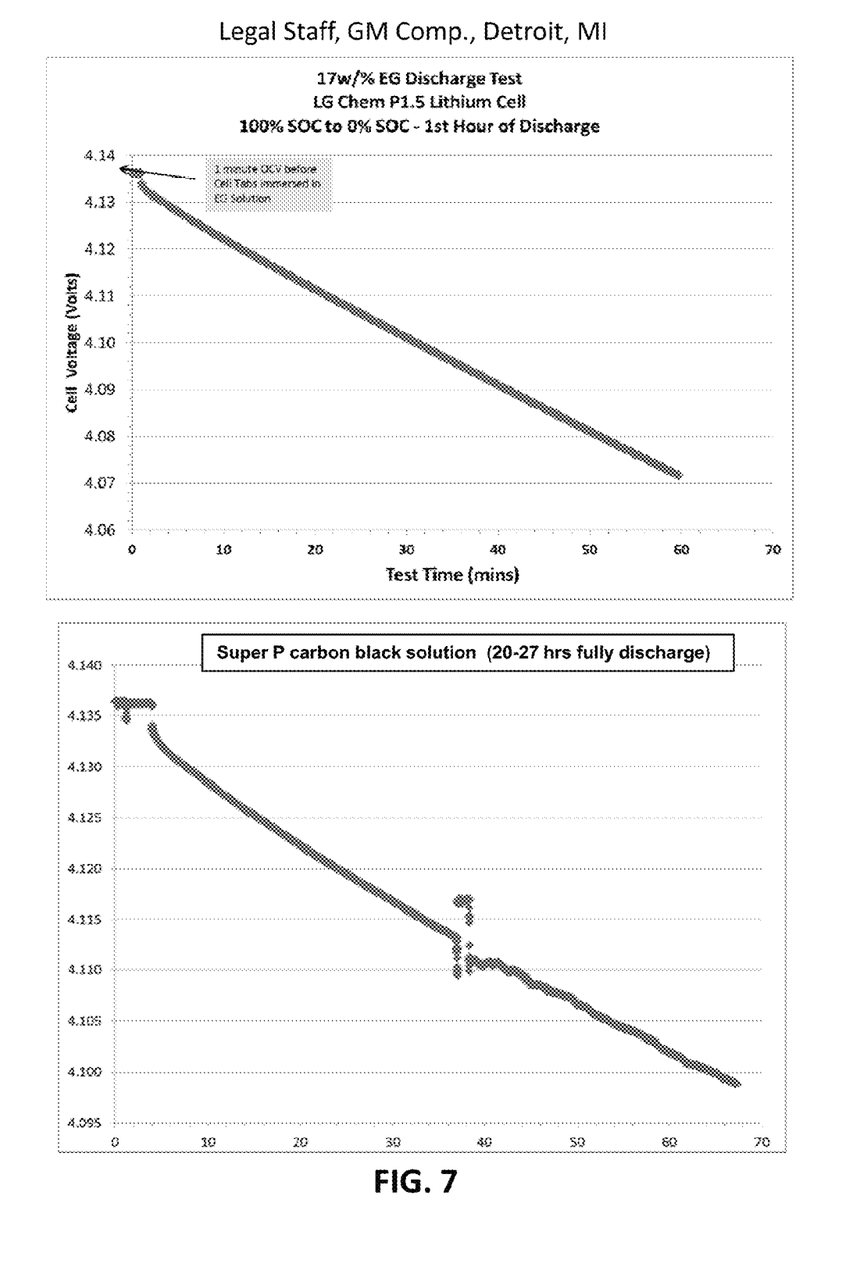
FIG. 7 illustrates that a depowering medium comprising expanded graphite can be utilized to depower a battery in a shorter period of time than a carbon-black based depowering medium.

The provided methods involve a depowering medium having tunable composition and resulting conductivity and viscosity. This allows for rapid, yet controlled, battery depower rates. FIGS. 5 and 6 illustrate this point, showing that a solution containing 17 weight percent expanded graphite in water allowed a representative battery (lithium ion) to be fully depowered in approximately 5 hours. This is significantly less than the approximately 30 hours needed when using similar carbon black-based solutions, as shown in FIG. 7. With tunable conductivity and viscosity, the battery discharge rate is well under control, including remaining within design thermal management requirements such that the temperature of the system remains within design limits. Such low temperature (for example, between about 40° C. and about 50° C.) provides indicia that the disclosed methods and system can be applied to depower fully charged batteries without introducing damaging temperatures in the vicinity of battery separators, electrodes, electrolytes and other internal components.

Example 5

A depowering medium of 8-10 weight percent expanded graphite was prepared using tap water, and such depowering medium was used to depower a fully charged battery pack of 126 cells. The pack was safely discharged in 8-10 hours. Failure analysis showed no adverse effects of "corrosion" on the voltage terminals. Further, the temperature during the depowering process was well under control and did not have an impact on the individual cells within the pack, as revealed by the failure analysis. This indicates that the provided methods are robust enough to use tap water to depower the fully charged battery pack without negative impact (corrosion issues) on the individual cell terminals that are fully immersed in the depowering medium.

The present disclosure should not be considered limited to the specific examples described herein, but rather should be understood to cover all aspects of the invention. Various modifications, equivalent processes, as well as numerous structures and devices to which the present invention may be applicable will be readily apparent to those of skill in the art. Those skilled in the art will understand that various changes may be made without departing from the scope of the invention, which is not to be considered limited to what is described in the specification.

What is claimed is:

1. A method of controlled battery depowering, comprising:
providing a depowering medium comprising between 1-20 weight % expanded graphite dispersed in an aqueous medium;
contacting positive and negative terminals of a battery to be depowered with the depowering medium; and
maintaining contact between the depowering medium and the positive and negative terminals for a period of between 1-72 hours to depower the battery.

2. A method according to claim 1, comprising forming the depowering medium by (i) providing the aqueous medium; (ii) providing the expanded graphite; (iii) dispersing the expanded graphite in the aqueous medium; and (iv) mixing to form a uniform mixture.

3. A method according to claim 1, wherein the battery is selected from lithium-ion, lead acid, and nickel-metal hydride batteries configured for automotive use.

4. A method according to claim 1, wherein the aqueous medium comprises between 10-50 weight % ethylene glycol.

5. A method according to claim 1, wherein the depowering medium comprises one or more dispersible non-ionic electric conductors selected from metallic powders, low melting point alloys, and conductive ceramics.

6. A method according to claim 5, wherein the electric conductor is selected from Ga—In—Sn alloy, copper powder, zinc powder, iron powder, nickel powder, titanium oxynitride, titanium diboride, titanium nitride, titanium carbide, chromium nitride, chromium carbide, and combinations thereof.

7. A method according to claim 1, wherein the depowering medium has a viscosity of between 100-50,000 cP.

8. A method according to claim 1, wherein the depowering medium has a resistivity of between 0.5-100 Ω·cm.

9. A method according to claim 1, wherein the depowering medium is provided in a container fluidly connected to the battery interior, and wherein a pressurization device fluidly connected to the battery interior and the container is utilized to contact the battery with the depowering medium.

10. A method of controlled battery depowering, comprising:
   providing an automotive battery to be depowered disposed within a container configured to receive a fluid, the battery selected from lithium-ion, lead acid, and nickel-metal hydride batteries;
   providing a depowering medium comprising (i) expanded graphite and (ii) one or more dispersible non-ionic electric conductors selected from metallic powders, low melting point alloys, and conductive ceramics dispersed in an aqueous medium;
   supplying the depowering medium to the container such that positive and negative terminals of the battery are contacted with the depowering medium; and
   maintaining contact between the depowering medium and the positive and negative terminals for a period of between 1-72 hours to depower the battery.

11. A method according to claim 10, comprising forming the depowering medium by (i) providing the aqueous medium; (ii) providing the expanded graphite; (iii) providing the one or more non-ionic electric conductors; (iv) dispersing the expanded graphite and one or more electric conductors in the aqueous medium; and (iv) mixing to form a uniform mixture.

12. A method according to claim 10, wherein the aqueous medium comprises between 10-50 weight % ethylene glycol.

13. A method according to claim 10, wherein the electric conductor is selected from Ga—In—Sn alloy, copper powder, zinc powder, iron powder, nickel powder, titanium oxynitride, titanium diboride, titanium nitride, titanium carbide, chromium nitride, chromium carbide, and combinations thereof.

14. A method according to claim 10, wherein the depowering medium has a viscosity of between 100-50,000 cP and a resistivity of between 0.5-100 Ω·cm.

15. A method of claim 1, wherein the aqueous medium is water with a low salt content.

\* \* \* \* \*